United States Patent
Gonzalez Escobedo et al.

(10) Patent No.: US 12,529,001 B2
(45) Date of Patent: Jan. 20, 2026

(54) METHOD FOR PRODUCING RENEWABLE GAS, RENEWABLE NAPHTHA, AND RENEWABLE JET FUEL

(71) Applicant: Neste Oyj, Espoo (FI)

(72) Inventors: Jose Luis Gonzalez Escobedo, Porvoo (FI); Marja Tiitta, Porvoo (FI); Eveliina Mäkelä, Porvoo (FI); Marja-Liisa Kärkkäinen, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 18/717,853

(22) PCT Filed: Nov. 21, 2022

(86) PCT No.: PCT/FI2022/050766
§ 371 (c)(1),
(2) Date: Jun. 7, 2024

(87) PCT Pub. No.: WO2023/126562
PCT Pub. Date: Jul. 6, 2023

(65) Prior Publication Data
US 2024/0417634 A1    Dec. 19, 2024

(30) Foreign Application Priority Data
Dec. 27, 2021  (FI) ..................................... 20216356

(51) Int. Cl.
*C10L 1/04*    (2006.01)
*B01J 35/45*   (2024.01)
(Continued)

(52) U.S. Cl.
CPC .................. *C10L 1/04* (2013.01); *B01J 35/45* (2024.01); *B01J 35/70* (2024.01); *B01J 35/77* (2024.01);
(Continued)

(58) Field of Classification Search
CPC .................. C10L 1/04; C10L 2270/04; C10L 2200/0469; C10G 49/08
See application file for complete search history.

(56) References Cited

U.S. PATENT DOCUMENTS

| | | | |
|---|---|---|---|
| 2011/0015459 A1* | 1/2011 | Aalto | C10G 3/47 585/310 |
| 2012/0016167 A1* | 1/2012 | Hanks | C10G 3/46 585/14 |

(Continued)

FOREIGN PATENT DOCUMENTS

| | | |
|---|---|---|
| EP | 1741768 A1 | 1/2007 |
| WO | 2006070073 A1 | 7/2006 |

(Continued)

OTHER PUBLICATIONS

International Search Report for PCT/FI2022/050766, mailed Feb. 10, 2023, 3 pages.

(Continued)

*Primary Examiner* — Youngsul Jeong
(74) *Attorney, Agent, or Firm* — Joshua B. Brady; Nixon & Vanderhye, P.C.

(57) ABSTRACT

The present invention relates to a method for producing renewable gas D, renewable naphtha E, and renewable jet fuel F or components thereto from a renewable feedstock A, in particular to methods comprising separate hydrodeoxygenation (20) and hydroisomerization steps (40) wherein the hydroisomerization is performed in the presence of a metal impregnated ZSM-23 catalyst.

19 Claims, 2 Drawing Sheets

(51) Int. Cl.
    *B01J 35/70*     (2024.01)
    *B01J 35/77*     (2024.01)
    *C10G 49/08*     (2006.01)

(52) U.S. Cl.
    CPC ............ *C10G 49/08* (2013.01); *B01J 2235/00* (2024.01); *B01J 2235/15* (2024.01); *C10L 2200/0469* (2013.01); *C10L 2270/04* (2013.01)

(56) References Cited

U.S. PATENT DOCUMENTS

| | | | |
|---|---|---|---|
| 2013/0090502 A1* | 4/2013 | Laakkonen | C11B 3/10 585/253 |
| 2013/0338414 A1 | 12/2013 | Fingland et al. | |
| 2014/0274664 A1 | 9/2014 | Weigel et al. | |
| 2014/0275689 A1 | 9/2014 | Petrovic et al. | |
| 2016/0177188 A1 | 6/2016 | Vilonen et al. | |

FOREIGN PATENT DOCUMENTS

| | | |
|---|---|---|
| WO | 2009151692 A2 | 12/2009 |
| WO | 2020016405 A1 | 1/2020 |
| WO | 2020016410 A1 | 1/2020 |

OTHER PUBLICATIONS

Written Opinion of the ISA for PCT/FI2022/050766, mailed Feb. 10, 2023, 7 pages.

International Preliminary Report on Patentability for PCT/FI2022/050766, dated Mar. 27, 2024, 11 pages.

Finnish Search Report for FI 20216356, dated Mar. 16, 2022, 2 pages.

Lee S.-W. et al., "Characteristics of Magnesium-Promoted Pt/ZSM-23 Catalyst for the Hydroisomerization of n-Hexadecane", In: Ind. Eng. Chem. Res. ACS Publications, May 23, 2013, vol. 52, 7 pages.

Ivo J Dijs et al., "Quantitative Determination by 14C Analysis of the Biological Component in Fuels", Radiocarbon, vol. 48, Nr 3, 2006, 9 pages.

\* cited by examiner

METHOD FOR PRODUCING RENEWABLE GAS, RENEWABLE NAPHTHA, AND RENEWABLE JET FUEL

CROSS-REFERENCE TO RELATED APPLICATIONS

This application is the U.S. national phase of International Application No. PCT/FI2022/050766 filed Nov. 21, 2022 which designated the U.S. and claims priority to FI 20216356 filed Dec. 27, 2021, the entire contents of each of which are hereby incorporated by reference.

FIELD

The present invention relates to a method for producing renewable gas, renewable naphtha, and renewable jet fuel or components thereto from a renewable feedstock, in particular to methods comprising separate hydrodeoxygenation and hydroisomerization steps wherein the hydroisomerization step is performed in the presence of a catalyst comprising Pt-impregnated ZSM-23 zeolite.

BACKGROUND

Hydroprocessing method is currently the most popular technology to produce renewable aviation fuel. The hydroprocessing pathway consists of a chemical conversion of renewable feedstock through hydrodeoxygenation, hydroisomerization and hydrocracking to renewable fuel components. Accordingly, the renewable feedstock is first converted to linear long chain hydrocarbons with hydrogen and a solid catalyst at high pressure and temperature. For this, deoxygenation and/or decarbonylation/hydrodecarboxylation reactions are performed, generating water, carbon monoxide and/or carbon dioxide as by-products. The linear long chain hydrocarbons generated are subjected to hydrocracking and/or hydroisomerization reaction conditions to give rise to hydrocarbons in the range of e.g., C5-C16 suitable for use as aviation fuel or components thereto. Additionally, light gasses and naphtha are produced which are separated from the renewable aviation fuel usually by distillation.

The co-product, renewal naphtha, can be used as a feedstock for steam crackers for producing bioplastics, for example, and as a biocomponent for gasoline. The renewable gas, in turn, includes renewable propane and renewable butane, which may be used in marine fuels, for domestic cooking and heating, or dehydrogenated into propene and butenes.

To utilize the co-products, the process should be such that the yield of renewable naphtha and renewable gas are high enough while not detracting from the renewable aviation fuel production.

WO2009151692A2 discloses a process for controlling the concurrent production of both diesel range hydrocarbons and aviation range hydrocarbons from renewable feedstocks such as plant oils and animal oils. According to the process a renewable feedstock is treated by hydrogenating and deoxygenating to provide an effluent comprising paraffins, isomerizing and selectively hydrocracking at least a portion of the paraffins at predetermined conditions, and separating by fractionation at predetermined fractionation conditions to generate a diesel range hydrocarbon product and an aviation range hydrocarbon product.

Accordingly, there is a need for a process for combined production of renewable jet fuel, renewable naphtha, and renewable gas.

SUMMARY

The present invention is based on the observation that when a renewable feedstock is hydrodeoxygenated followed by hydroisomerization using a catalyst comprising Pt-impregnated ZSM-23 zeolite, an advantageous hydrocarbon product spectrum and a carbon number yield distribution differing from other catalysts can be obtained.

Accordingly, it is an object of the present invention to provide a method for producing simultaneously renewable gas, renewable naphtha, and renewable jet fuel or components thereto from a renewable feedstock the method comprising:

a) providing the renewable feedstock,
b) pre-treating the renewable feedstock by reducing the amount of impurities therein not to include: more than 10 w-ppm alkali metal and alkaline earth metal impurities, calculated as elemental alkali metals and alkaline earth metals; more than 10 w-ppm other metals, calculated as elemental metals; more than 1000 w-ppm nitrogen containing impurities, calculated as elemental nitrogen; more than 30 w-ppm phosphorus containing impurities, calculated as elemental phosphorus; more than 5 w-ppm silicon containing impurities, calculated as elemental silicon; to produce a pre-treated feedstock,
c) subjecting the pre-treated feedstock to hydrodeoxygenation reaction to produce a hydrodeoxygenated stream, wherein the hydrodeoxygenation reaction comprises one or more of:
  a. a temperature in the range from 250° C. to 400° C.,
  b. a pressure in the range from 10 to 200 bar,
  c. a WHSV in the range from 0.25 to 3 $h^{-1}$,
  d. a $H_2$ flow from 350 to 1500 N-L $H_2$/L feed, and
  e. a hydrodeoxygenation catalyst selected from Pd, Pt, Ni, Co, Mo, Ru, Rh, and W or any combination thereof, on a support, to produce hydrodeoxygenated stream,
d) subjecting the hydrodeoxygenated stream to a gas-liquid separation thereby producing a gaseous stream and a hydrodeoxygenated liquid stream,
e) subjecting the hydrodeoxygenated liquid stream to hydroisomerization reaction comprising
  i. a temperature in the range from 270° C. to 340° C.,
  ii. a pressure in the range from 1 bar to 100 bar, and
  a hydroisomerization catalyst comprising a metal impregnated ZSM-23 zeolite on a support, wherein
  a. the metal is selected from noble metals and Ni and any combinations thereof, and metal content of the catalyst is from 0.1 wt-% to 5.0 wt-%,
  b. the ZSM-23 zeolite comprises one or more of the following features
    $SiO_2/Al_2O_3$ molar ratio is from 10 to 85, preferably from 15 to 85 such as from 40 to 80,
    crystallinity is from 40% to 95%, measured by X-ray diffraction (XRD) according to ASTM D5758-01 (2021),
    BET surface area is from 180 $m^2$/g to 350 $m^2$/g, such as from 200 $m^2$/g to 300 $m^2$/g, determined by nitrogen physisorption,
    acidity is from 250 µmol/g to 500 µmol/g, measured with $NH_3$-TPD method, wherein acidity is calculated from the amount of $NH_3$ adsorbed at 200° C. and desorbed between 100° C. and 500° C.,
ratio of Brønsted acid sites to Lewis acid sites is from 10 to 20, measured by the pyridine FTIR, and
crystalline zeolite particles are needle-like particles of a size below 2 μm along the needle, and
c. the support comprises alumina, silica, or alumina-silica in a hydrogen flow to produce a hydroisomerized stream,
f) optionally subjecting the hydroisomerized stream to stabilization, to produce a stabilized hydroisomerized stream, and
g) separating the hydroisomerized stream, or optionally the stabilized hydroisomerized stream, at least to
  i) a fraction rich in C3-C4 hydrocarbons, thereby producing the renewable gas,
  ii) a fraction rich in C5-C9 hydrocarbons, thereby producing the renewable naphtha, and
  iii) a fraction rich in C10-C16 hydrocarbons, thereby producing the renewable jet fuel or components thereto.

It is also an object of the present invention to provide use of a catalyst comprising metal impregnated ZSM-23 zeolite on a support, wherein
  a) the metal is selected from noble metals and Ni and any combinations thereof, and metal content of the catalyst is from 0.1 wt-% to 5.0 wt-%,
  b) the ZSM-23 zeolite comprises one or more of the following features $SiO_2/Al_2O_3$ molar ratio is from 10 to 85, preferably from 15 to 85 such as from 40 to 80,
    crystallinity is from 40% to 95%, measured by X-ray diffraction (XRD) according to ASTM D5758-01 (2021),
    BET surface area is from 180 m$^2$/g to 350 m$^2$/g, such as from 200 m$^2$/g to 300 m$^2$/g, determined by nitrogen physisorption,
    acidity is from 250 μmol/g to 500 μmol/g, measured with $NH_3$-TPD method, wherein acidity is calculated from the amount of $NH_3$ adsorbed at 200° C. and desorbed between 100° C. and 500° C.,
    ratio of Brønsted acid sites to Lewis acid sites is from 10 to 20, measured by the pyridine FTIR, and
    crystalline zeolite particles are needle-like particles of a size below 2 μm along the needle, and
  c) the support comprises alumina, silica, or alumina-silica
for producing renewable gas, renewable naphtha and renewable jet fuel or components thereto from a renewable paraffinic feed by hydroisomerization reaction in presence of hydrogen flow, wherein the hydroisomerization reaction comprises one or more of:
  i. a temperature in the range from 270° C. to 340° C.,
  ii. a pressure in the range from 10 bar to 100 bar,
  iii. a WHSV in the range from 0.5 h$^{-1}$ to 3 h$^{-1}$, and
  iv. a $H_2$ flow of 100-800 N-L $H_2$/L feed.

A number of exemplifying and non-limiting embodiments of the invention are described in accompanied dependent claims.

Various exemplifying and non-limiting embodiments of the invention together with additional objects and advantages thereof, will be best understood from the following description of specific exemplifying and non-limiting embodiments when read in connection with the accompanying figure.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e., a singular form, throughout this document does not exclude a plurality.

LIST OF THE FIGURES

DESCRIPTION

Figure 1:
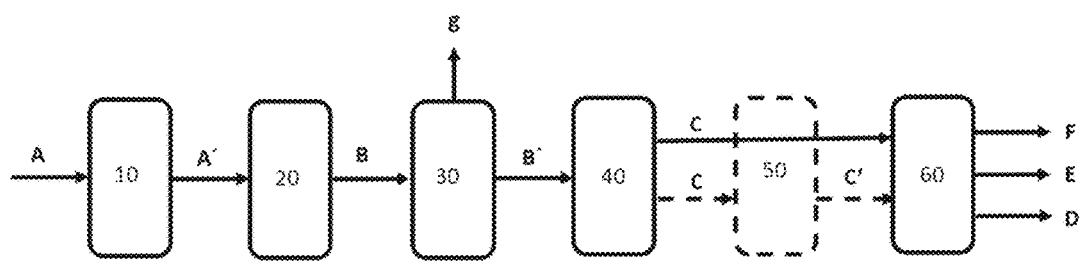
FIG. 1 shows an exemplary process of the present invention for combined production of renewable gas, renewable naphtha, and renewable jet fuel.

FIG. 1 shows an exemplary process of the present invention for combined production of renewable gas, renewable naphtha, and renewable jet fuel fractions. In the figure, the streams and the reactions are marked with letters and numbers, respectively.

According to one embodiment method comprises the following steps:
  a) providing a renewable feedstock, A,
  b) subjecting the feedstock to a pre-treatment step 10 to produce a pre-treated feedstock A',
  c) subjecting the pre-treated feedstock to hydrodeoxygenation 20 reaction to produce hydrodeoxygenated stream B,
  d) subjecting the hydrodeoxygenated stream to gas-liquid separation 30 thereby producing a gaseous stream g and a hydrodeoxygenated liquid stream B',
  e) subjecting the hydrodeoxygenated liquid stream to hydroisomerization 40 reaction to produce a hydroisomerized stream C,
  f) optionally subjecting the hydroisomerized stream to stabilization 50 to produce stabilized hydroisomerized stream C' and
  g) separating 60 the hydroisomerized stream or the optional stabilized hydroisomerized stream at least to
    i) a fraction D rich in C1-C4 hydrocarbons, thereby producing the renewable gas,
    ii) a fraction E rich in C5-C9 hydrocarbons, thereby producing renewable naphtha or components thereto, and
    iii) a fraction F rich in C10-C16 hydrocarbons thereby producing the renewable jet fuel or components thereto.

The Feedstock

A process for preparing hydrocarbons from an oxygenated renewable hydrocarbon feedstock is disclosed. Examples of oxygenated hydrocarbon feedstocks are fatty acids and triglycerides, which are present in large amounts in e.g. plant oils and animal fats. An oxygenated hydrocarbon feedstock of renewable origin, such as plant oils and animal fats, is well suited for the process. The majority of these plant oils and animal fats are typically composed of fatty acids, either as free fatty acids or as esters of free fatty acids, such as fatty acids of 25 wt-% or 40 wt-% or more. Examples of esters of free fatty acids are fatty acid glyceride esters (mono-, di- and/or tri-glyceridic) or for example the fatty acid methyl esters (FAME) or fatty acid ethyl esters (FAE). Accordingly, the oxygenated hydrocarbon feedstocks of renewable origin may contain 25 wt-% or more of fatty acids or fatty acid esters.

The renewable character of carbon-containing compositions, such as feedstocks and products of biological origin i.e., renewable feedstock and products, can be determined by comparing the $^{14}$C-isotope content of the feedstock to the $^{14}$C-isotope content in the air in 1950. The $^{14}$C-isotope content can be used as evidence of the renewable origin of the feedstock or product. Carbon atoms of renewable material comprise a higher number of unstable radiocarbon ($^{14}$C) atoms compared to carbon atoms of fossil origin. Therefore, it is possible to distinguish between carbon compounds derived from biological sources, and carbon compounds derived from fossil sources by analyzing the ratio of $^{12}$C and $^{14}$C isotopes. Thus, a particular ratio of said isotopes can be used to identify and quantify renewable carbon compounds and differentiate those from non-renewable i.e., fossil carbon compounds. The isotope ratio does not change in the course of chemical reactions. Examples of a suitable method for analyzing the content of carbon from biological sources is ASTM D6866 (2020). An example of how to apply ASTM D6866 to determine the renewable content in fuels is provided in the article of Dijs et al., Radiocarbon, 48 (3), 2006, pp 315-323. For the purpose of the present invention, a carbon-containing material, such as a feedstock or product is considered to be of renewable origin if it contains 90% or more modern carbon, such as 100% modern carbon, as measured using ASTM D6866.

The feedstock may include animal and fish oils/fats, plant oils and/or vegetable oils and/or microbial oils like babassu oil, palm seed oil, carinata oil, olive oil, coconut butter, soybean oil, canola oil, coconut oil, muscat butter oil, rapeseed oil, peanut oil, sesame oil, maize oil, sunflower oil, poppy seed oil, cottonseed oil, soy oil, laurel seed oil, crude tall oil, tall oil, tall oil fatty acid, tall oil pitch, crude palm oil, palm oil, palm oil fatty acid distillate, jatropha oil, palm kernel oil, camelina oil, archaeal oil, bacterial oil, fungal oil, protozoal oil, algal oil, seaweed oil, mustard seed oil, oils from halophiles, lauric-myristic acid group (C12-C14) including milk fats, palmitic acid group (C16) including earth animal fats, stearic acid group (C18) including earth animal fats, linoleic acid group (unsaturated C18) including whale and fish oils, erucic acid group (unsaturated C22) including whale and fish oils, oleo stearic acid group (conjugated unsaturated C18) including whale and fish oils, fats with substituted fatty acids (ricin oleic acid, C18) such as castor oil, and mixtures of any two or more thereof.

The oils of the feedstock may be classified as crude, degummed, heat treated and RBD (refined, bleached, and deodorized) grade, depending on the level of pre-treatment and residual phosphorus and metals content. Animal fats and/or oils may include inedible tallow, edible tallow, technical tallow, floatation tallow, lard, poultry fat, poultry oils, fish fat, fish oils, and mixtures of any two or more thereof. Greases may include yellow grease, brown grease, waste vegetable oils, restaurant greases, trap grease (FOG) from municipalities such as water treatment facilities, and spent oils from industrial packaged food operations, and mixtures of any two or more thereof.

The feedstock may include derivatives of natural fats include mono- or diglycerides of C10-C28 fatty acids, C10-C28 fatty acids, C10-C28 fatty acid anhydrides, non-glyceride C10-C28 fatty acid esters, C10-C28 fatty alcohols, C10-C28 fatty aldehydes and C10-C28 fatty ketones. The C10-C28 fatty acids, their mono- and diglycerides, are typically prepared by hydrolysis of the corresponding triglyceride. The non-glyceride C10-C28 fatty acid esters are mainly prepared from the triglycerides by transesterification. The C10-C28 fatty alcohols, aldehydes and ketones are prepared by reduction, usually by hydrogenation, of the corresponding fatty acids. Advantageously, the feedstock hydrocarbons may be of C10-C24.

The derivatives of natural fats also include any of the aforementioned natural fats and derivatives, the hydrocarbon chain of which has been modified e.g., by substitution, branching or saturation.

An exemplary feedstock comprises at least triglycerides. Most typical exemplary feedstocks are animal fats and palm oil fatty acid, especially those originating from waste and residues.

A further exemplary feedstock comprises at least fatty acids. Most typical feedstock are various plant oils, and e.g., tall oil materials, such as crude tall oil.

The natural fats or derivatives thereof may be provided in pure form or as part of a feedstock containing other components. Preferably, the feedstock contains at least 20 wt-% more preferably at least 30 wt-%, most preferably at least 40 wt-%, of pure natural fat or natural oil or their derivatives.

An exemplary renewable feedstock preferably includes waste and residue materials originating from animal fat/oil, plant fat/oil or fish fat/oil. These may comprise sludge palm oil, such as palm effluent sludge (PES) or palm oil mill effluent (POME), used cooking oil (UCO), acid oils (ASK), brown grease (BG), sludge palm oil, spent bleaching earth oil (SBEO), technical corn oil (TCO) or lignocellulosic based oils, municipal solid waste-based oils, or algae-based oils. Most preferably, the feeds include UCO, sludge palm oil, TCO and algae-based oils.

Pre-Treatment

Typically, the waste and residue materials contain a wide variety of heteroatomic compounds, which often are more difficult to remove by conventional feedstock pre-treatments typically used for pre-treatment of matrices comprising triacylglycerols. The waste and residue materials may comprise accumulated alkali metals and alkaline earth metals, such as sodium, potassium, calcium, magnesium; other metals such as iron or copper; nitrogen containing compounds, such as amines and amides; phosphorus containing compounds, such as phospholipids; silicon containing compounds, such as siloxanes and polydimethylsiloxanes (PDMS); halides, sulphur containing compounds, etc. depending on the type of residue/waste. These materials are typically harmful for the catalyst used in hydrotreatment and isomerization and need to be decreased or removed before entering the feedstock onto the catalysts.

Depending on the level of pre-treatment, fats, oils, and greases may contain high amounts of impurity materials e.g., about 1-1000 w-ppm (ppm by weight) phosphorus; and about 1-500 w-ppm total metals, mainly sodium, potassium, magnesium, calcium, iron, and copper. Nor is it uncommon that animal fat can contain e.g., 1000 w-ppm or even higher nitrogen measured as elemental nitrogen.

The feedstock of the present method needs to be suitable for hydrodeoxygenation. Typically, the feedstock entering into a hydrodeoxygenation reactor or a catalyst bed thereof should not include more than 10 w-ppm, preferably not more than 5 w-ppm, more preferably not more than 1 w-ppm alkali metal and alkaline earth metal impurities, calculated as elemental alkaline and alkaline earth metals; not more than 10 w-ppm, preferably not more than 5 w-ppm, more preferably not more than 1 w-ppm other metals, calculated as elemental metals; not more than 1000 w-ppm, preferably not more than 500 w-ppm, more preferably not more than 150 w-ppm, most preferably not more than 50 w-ppm, such as not more than 5 w-ppm, such as not more than 1 w-ppm nitrogen containing impurities, calculated as elemental nitrogen; not more than 30 w-ppm, preferably not more than 15 w-ppm, more preferably not more than 5 w-ppm, such as not more than 1 w-ppm phosphorus containing impurities, calculated as elemental phosphorus; not more than 5 w-ppm, preferably not more than 1 w-ppm silicon containing impurities, calculated as elemental silicon; optionally not more than 100 w-ppm, preferably not more than 50 w-ppm, most preferably not more than 30 w-ppm, such as not more than 10 w-ppm, such as not more than 5 w-ppm sulphur containing impurities, calculated as elemental sulphur, and optionally not more than 20 w-ppm, preferably not more than 10 w-ppm, more preferably not more than 5 w-ppm chlorine containing impurities, calculated as elemental chlorine. Depending on the efficiency of the hydrotreating catalyst bed system and the hydrotreatment reactor unit configuration even a high amount of nitrogen impurities in the feed may be tolerated, and the effluent from the HDO may contain suitably low amount of nitrogen impurities to enable subjecting it to subsequent catalytic processes.

There are several known methods to remove or decrease the amount of harmful materials, and varying purification or pre-treatment methods are commonly applied. Exemplary pre-treatment methods suitable for the present disclosure comprise treating with mineral acids, degumming, treating with hydrogen, heat treating, deodorizing, washing with water, treating with base, demetallation, distillation, removal of solids, bleaching, and any combinations thereof.

Contaminating metals may be removed from the feedstock e.g., by treatment with mineral acids. Phosphorus which mostly occurs in the form of phosphates may be removed by degumming. Triglycerides can also be pre-hydrogenated (pre-treated with hydrogen). Besides reducing the amount of oxygen containing compounds (HDO), unsaturation, sulphur, and nitrogen content (HDS, HDN) are reduced. Solid feedstocks such as fats, in turn should be liquified e.g., by heating prior to subjecting to hydrodeoxygenation. Pre-treatment of solid feedstocks may further include one or more of: grinding, agitating, filtering, and sonicating. The feedstock may further be bleached and/or deodorized.

The pre-treatment can be selected from heat treatment optionally followed by evaporation of volatiles; heat treatment with adsorbent (HTA), optionally followed by flash evaporation; degumming; bleaching. According to one embodiment the pre-treatment includes any one of, any combination of, or all of a degumming step, a chemical treating step, a water-wash step, a demetallation step, a bleaching step, a full (or partial) hydrogenation step, an acid gas removal step, and/or a water removal step. The pre-treatment also typically comprises a step of removing impurities from the feedstock, including any suitable removal of solids from a liquid, including filtration, centrifugation, and sedimentation; and removing volatiles from liquid, e.g., by evaporation. In the pre-treatment the feedstock comprising organic material of biological origin, as previously defined, is purified and a purified feedstock is obtained.

In one embodiment the pre-treatment is selected from heat treatment optionally followed by evaporation of volatiles, whereby the feedstock is heated at a temperature of from 80° C. to 325° C., preferably 180° C. to 300° C., more preferably 200° C. to 280° C., in a residence time from 1 to 300 min. The heat treatment can be followed by an evaporation step, where especially silicon and phosphorous containing compounds are removed. An example of heat treatment of a feedstock comprising organic material can be found in WO 2020/016405. Heat treatment can also be followed by filtration as an addition or an alternative to evaporation. When the feedstock comprises brown grease or acidulated soap stock the pre-treatment comprises typically heat treatment with or without a filter-aid (adsorbent) followed by filtration and possible bleaching.

In one embodiment the pre-treatment is selected from heat treatment with adsorbent (HTA) optionally followed by flash evaporation. HTA as pre-treatment is especially suitable when the feedstock comprises CTO and/or TOP, but HTA is also suitable for other feedstocks. Heat treatment with adsorbent (HTA) can be performed in a temperature from 180° C. to 325° C., preferably from 200° C. to 300° C., more preferably from 240° C. to 280° C., optionally in the presence of an acid. The adsorbent can be selected from alumina silicate, silica gel and mixtures thereof and is typically added in an amount of 0.1 wt-% to 10 wt-%, such as 0.5 wt-%. An example of HTA can be found in WO 2020/016410.

In one embodiment the pre-treatment is selected from bleaching. Bleaching can be conducted by acid addition in an amount of from 500 to 5000 ppm based on feed. The bleaching treatment can be performed in a temperature from 60° C. to 90° C. and including a drying step in 110° C. to 130° C. The bleaching is finished by a filtration step to remove formed solids and possible filter aids. In one example bleaching includes the following sequence (1) acid addition 1000-4000 ppm citric acid (50 wt-% water) 85° C., 10 min;
(2) adsorbent/filter aid addition 0.1-1 wt-%, 85° C., 800 mbar, 20 min;
(3) drying 120° C., 80 mbar, 25 min
(4) filtering 120° C., 2.5 bar.

Both heat treatment (HT) and heat treatment with adsorbent (HTA) can be performed under pressure, the pressure can be 500 to 5000 kPa. Also, water can be added before or during HT and HTA to a level of up to 5 wt-%, such as 1 wt-%-3 wt-%. The evaporation e.g., flashing can be performed after HT or HTA or any other pre-treatment stage and can be performed at about 160° C., such as from 150° C. to 225° C., in a pressure of 10 to 100 mbar.

In one embodiment the pre-treatment comprises heat treatment (HT) and bleaching.

In one embodiment the pre-treatment comprises heat treatment (HT) with alkali addition and bleaching.

In one embodiment the pre-treatment comprises heat treatment with adsorption (HTA) followed by flash (removal of light components comprising Si components etc. by evaporation) and bleaching.

In addition, the pre-treatment may or may not include additional steps such as removal of solids (using technologies such as centrifugation or filtration) before and/or after HT or HTA, water washing, degumming, hydrolysis, distillation, strong acid treatment, 2nd bleaching or any combination of the mentioned methods.

Feedstock suitably purified by pre-treatment prolongs the catalyst life cycle in hydrodeoxygenation and subsequent reactions like isomerization or cracking.

Hydrodeoxygenation

As defined herein deoxygenation is a method for the removal of covalently bound oxygen from organic molecules. Hydrodeoxygenation refers herein to removal of oxygen as $H_2O$, $CO_2$ and/or CO from the oxygen containing hydrocarbons by hydrodeoxygenation, decarboxylation and/or decarbonylation. Whereas during catalytic cracking, there will be acid catalyzed breaking down of C—C bonds of hydrocarbons or breaking down long chained hydrocarbons to form shorter hydrocarbon chains or branching or cyclisation without the need for presence of molecular hydrogen, merely under the influence of a suitable catalyst.

As defined herein hydrogenation is a method for saturation of carbon-carbon double bonds by means of molecular hydrogen under the influence of a catalyst.

The hydrotreatment comprising deoxygenation and isomerization reactions may be conducted in a single reactor conducting hydrodeoxygenation and isomerization reactions in same or subsequent catalyst beds, in multiple catalyst bed systems, or in separate reactors. Preferably, the deoxygenation and isomerization reactions of the hydrotreatment are conducted in separate deoxygenation and isomerization steps in subsequent catalyst beds in the same reactor or in separate reactors.

According to the present method the pre-treated feedstock is subjected to hydrodeoxygenation. The hydrodeoxygenation of renewable oxygen containing hydrocarbons is performed at reaction conditions comprising one or more of
  a. a temperature in the range from 250° C. to 400° C., preferably from 280° C. to 380° C., more preferably from 300° C. to 360° C.,
  b. a pressure in the range from 10 bar to 200 bar, preferably from 20 bar to 100 bar, more preferably from 20 bar to 80 bar,
  c. a weight hourly space velocity (WHSV) in the range from 0.25 $h^{-1}$ to 3.0 $h^{-1}$, preferably from 0.5 $h^{-1}$ to 3.0 $h^{-1}$, more preferably from 0.7 $h^{-1}$ to 2.5 $h^{-1}$, most preferably from 1.0 $h^{-1}$ to 2.0 $h^{-1}$, depending on the hydrogen consumption,
  d. a $H_2$ flow in the range from 350 to 1500 N-L $H_2$/L feed, preferably from 350 to 1100 N-L $H_2$/L feed, most preferably from 350 to 1000 N-L $H_2$/L feed, wherein N-L $H_2$/L means normal liters of hydrogen per liter of the feed into the HDO reactor, and
  e. a hydrodeoxygenation catalyst selected from Pd, Pt, Ni, Co, Mo, Ru, Rh, W, or any combination of these on a support, preferably Ni, Co, Mo, and W, on a support.

According to one embodiment the hydrodeoxygenation catalyst is selected from a group consisting of CoMo, NiMo, NiW, and CoNiMo on a support, wherein the support is preferably alumina and/or silica.

According to a particular embodiment the hydrodeoxygenation reaction conditions comprise temperature in the range from 250° C. to 400° C., pressure in the range from 20 bar to 80 bar, a WHSV in the range from 0.5 $h^{-1}$ to 3 $h^{-1}$, and $H_2$ flow of 350-1500 N-L $H_2$/L feed, and a hydrodeoxygenation catalyst.

In one embodiment, the hydrodeoxygenation hydrodeoxygenation (HDO) of renewable oxygen containing hydrocarbons is most preferably carried out in the presence of sulphided NiMo or sulphided CoMo catalysts on a support in the presence of hydrogen gas. Using a sulphided catalyst, the sulphided state of the catalyst may be maintained during the HDO step by an addition of sulphur in the gas phase or by using a feedstock having sulphur containing mineral oil blended with the renewable oxygen containing hydrocarbons. Sulphur may be deliberately added to the feedstock being subjected to hydrodeoxygenation, for example, within a range from 50 w-ppm (ppm by weight) to 20 000 w-ppm, preferably within a range from 100 w-ppm to 1000 w-ppm, when using hydrodeoxygenation catalysts requiring a sulphided form for operation.

Effective conditions for hydrodeoxygenation may reduce the oxygen content of HDO effluent, to less than 1 wt-%, such as less than 0.5 wt-% or less than 0.2 wt-%.

In addition to oxygen removal, the hydrotreatment conditions used are to some extent able to reduce further e.g., the amount of nitrogen by hydrodenitrogenation (HDN), sulphur by hydrodesulphurization (HDS), and aromatics by hydrodearomatization (HDA) in the feed.

Purification of the Hydrodeoxygenated Stream

The effluent of the hydrodeoxygenation step, i.e., the hydrodeoxygenated stream, may be purified before hydroisomerization. Typically, the purification includes subjecting the effluent to a gas-liquid separation i.e., removing gases such as carbon monoxide, carbon dioxide, water, possible hydrogen sulfide and ammonia and low boiling hydrocarbons, from the liquid hydrocarbon stream. In the gas-liquid separation the hydrodeoxygenated effluent is separated into a gaseous stream and into a hydrodeoxygenated liquid stream, which separation may be a stripping step or be followed by a stripping step, where the hydrodeoxygenated liquid stream may be stripped with a stripping gas, such as hydrogen. This may occur in a high temperature and/or high-pressure separation step, for example, at a temperature between 300° C. and 330° C. and pressure between 40-50 bar.

In one embodiment the obtained purified liquid hydrocarbon stream may be separated into suitable carbon number ranges for further processing e.g., by distillation. The purification may further include removing C17 and higher hydrocarbons from the effluent stream e.g., by distillation.

In one embodiment, the obtained hydrodeoxygenated stream directed to hydroisomerization is mainly in a liquid form.

The hydrodeoxygenated liquid stream used for hydroisomerization comprises preferably at least 92 wt-%, more preferably at least 95 wt-%, most preferably at least 99 wt-% paraffins of the total weight of the hydrocarbons. The amount of n-paraffins may be high, preferably more than 85 wt-%, more preferably more than 90 wt-%, e.g., such as 95 wt-%, especially when using NiMo/$Al_2O_3$ as the hydrodeoxygenation catalyst for most of the feeds.

It is generally known that alkane and paraffin are synonyms and can be used interchangeably. Isoparaffins (i-paraffins) are branched, open chain paraffins, and normal paraffins (n-paraffins) are unbranched linear paraffins. In the context of this disclosure, the term "paraffin" refers to n-paraffins and/or isoparaffins. Similarly, the term "paraffinic" refers herein to compositions comprising n-paraffins and/or isoparaffins.

Hydroisomerization

It is known, for example from EP1741768, that zeolites such as ZSM-12, ZSM-23, SAPO-11, SAPO-41 or fernerite, together with Pt, Pd, or Ni on an alumina or silica support may be used, together or as alternatives to each other, for isomerization of renewable paraffins into typical monomethyl branched hydrocarbons, such as diesel fuel components.

Known challenges in zeolite-based chemistry include e.g., loss of carbon to coke, catalyst stability, and cracking to unsuitable carbon range molecules. These may be overcome by careful selection of suitable catalyst properties, feed quality and operating conditions.

According to the method of the present invention the hydroisomerization reaction of the hydrodeoxygenated liquid stream is performed in the presence of a hydroisomerization catalyst, comprising a metal selected from platinum, palladium, nickel, and iridium and any combinations thereof, such as Pt, Pd, Pt—Pd, or Ni; a one-dimensional, 10-membered ring zeolite which has an MTT framework, namely ZSM-23; and a support. The hydroisomerization catalyst comprising metal impregnated ZSM-23 zeolite on a support further comprises one or more of the following features:

The noble metal or Ni content is from 0.1 wt-% to 5.0 wt-% of the catalyst, such as from 0.2 wt-% to 2.0 wt-%, such as from 0.3 wt-% to 1.0 wt-%, or even such as from 0.4 wt-% to 0.6 wt-%, such as about 0.5 wt-% of the catalyst. Preferably, the catalyst is the noble metal, more preferably it is platinum. The amount of the metal needed in the catalyst depends on the metal. The noble metals may be used in a lesser amount than e.g. Ni, which is known to be less active.

The ZSM-23 zeolite comprises one or more of the following features:

The $SiO_2/Al_2O_3$ molar ratio is from 10 to 85, preferably from 15 to 85, such as from 40 to 80.

The crystallinity is from 40% to 95%, measured by X-ray diffraction (XRD) according to ASTM D5758-01 (2021).

The BET surface area is from 180 m$^2$/g to 350 m$^2$/g, such as from 200 m$^2$/g to 300 m$^2$/g, determined by nitrogen physisorption.

The acidity is from 250 µmol/g to 500 µmol/g, measured with NH$_3$-TPD method, which particular method is described and discussed in detail in the applicant's former patent application WO2006070073A1, p. 10.

The ratio of Brønsted acid to Lewis acid sites is from 10 to 20, measured by the pyridine FTIR.

Crystalline zeolite particles are needle-like particles of a size below 2 µm along the needle.

The support comprises alumina, silica, or alumina-silica.

In the present disclosure the ZSM-23 zeolite of the catalyst has the following properties: Si amount is from 39 wt-% to 43 wt-%, such as about 41 wt-%; Al amount is from 0.5 wt-% to 3 wt-%, such as 1.9 wt-%; $SiO_2/Al_2O_3$ molar ratio is from 10 to 85, such as from 15 to 85, such as from 35 to 80, such as from 40 to 80, such as from 40 to 65, such as from 40 to 55; the crystallinity is from 40% to 95%, such as from 40 to 70%, such as from 40% to 65%, such as about 60%, determined by XRD; and the BET surface area is from 180 m$^2$/g to 350 m$^2$/g, such as from 200 to 300 m$^2$/g, such as from 200 to 260 m$^2$/g, such as 200 to 250 m$^2$/g; such as about 214 m$^2$/g, measured by N$_2$ physisorption.

In a preferred embodiment, the ZSM-23 zeolite of the catalyst has the following properties: The silica/alumina molar ratio is from 40 to 65, preferably from 40 to 50; crystallinity is from 40% to 95%, preferably from 40% to 65%, most preferably about 60%; and the BET surface area is from 200 m$^2$/g to 300 m$^2$/g, preferably from 200 m$^2$/g to 260 m$^2$/g, more preferably 200 m$^2$/g to 250 m$^2$/g; most preferably about 214 m$^2$/g; the acidity is from 250 µmol/g to 500 µmol/g, preferably from 250 µmol/g to 350 µmol/g, such as 270 µmol/g; and the ratio of Brønsted to Lewis acid sites is from 10 to 20, preferably from 12 to 18, most preferably about 15.

According to a preferred embodiment, the ZSM-23 zeolite comprises needle-like particles of a size below 2 µm along the needle.

The most preferred catalyst is a ZSM-23 zeolite comprising needle-like particles of size below 2 µm, containing about 0.5 wt-% platinum, most preferably from 0.48 to 0.52 wt-%, in reduced form on an alumina support. The ZSM-23 zeolite of the catalyst has a silica/alumina molar ratio is from 40 to 50, most preferably about 42; crystallinity from 40 to 65%, most preferably about 60%; a BET surface area from 200 m$^2$/g to 250 m$^2$/g, most preferably about 214 m$^2$/g; acidity is from 250 µmol/g to 350 µmol/g, most preferably about 270 µmol/g; and a ratio of Brønsted to Lewis acid sites from 12 to 18, most preferably about 15.

The noble metal or Ni containing ZSM-23 may be impregnated with the catalytic metals. The impregnation may be achieved by known dry or wet methods. According to an exemplary embodiment Pt is impregnated using an aqueous Pt(NH$_3$)$_4$Cl$_2$ or Pt(NH$_3$)$_4$(NO$_3$)$_2$ solution. The metal, in particular platinum, may be added to the zeolite alone or to the catalyst, i.e., zeolite with a support, such as alumina or silica. The metal loading and dispersion are important factors in order to have a proper balance between the metal and the acid functions in the catalyst. A loading around 0.5-1.0 wt-% creates a good balance between metallic and acid sites. The amount of platinum neither affects the surface area nor acidity (NH$_3$-TPD) of the final catalyst.

The catalyst may further comprise a support material, such as alumina, silica, and alumina-silica. The support is not catalytically active, but it may affect the acidic properties of the catalyst and thus change the proton exchange capacity of the zeolite. The support may further block zeolite channels during extruding or pelletizing.

Prior to use the catalyst material may be subjected to pre-treatment including drying, reduction, wetting and stabilization. An exemplary pre-treatment process the catalyst of the present disclosure may be pretreated by at least one or several of the following steps: drying, preferably at a temperature of about 125° C. for 8 h under N$_2$ flow; reducing, preferably at a temperature of about 350° C. for 2 h at a pressure of about 40 bar under H$_2$ flow; wetting, preferably at a temperature of about 200° C. for 2 h at a pressure of about 40 bar under H$_2$ flow; stabilizing, preferably at a temperature of about 200° C. for 2 h at a pressure of about 40 bar under H$_2$ flow.

According to the present disclosure the catalyst is subjected to the hydrodeoxygenated liquid stream i.e., effluent from the HDO under hydroisomerization reaction conditions comprising one or more, preferably all, of the following:

A temperature in the range from 270° C. to 340° C.

A pressure in the range from 10 bar to 100 bar

A WHSV in the range from 0.5 h$^{-1}$ to 3 h$^{-1}$

A H$_2$ flow of 100-800 N-L H$_2$/L feed, whereby, a hydroisomerized stream is produced.

The isomerization step is performed at a temperature from 270° C. to 340° C., preferably from 280° C. to 320° C. The processing temperature refers to the temperature at the process inlet. An exemplary temperature is 280° C. Another exemplary temperature is 310° C. The temperature may be dependent on the metal and the loading thereof in the catalyst. As noble metals are known to be more active compared e.g., to Ni, they may require higher temperatures. The influence of increasing temperature may be compensated by the amount of metal loading.

In one embodiment, the isomerization temperature for the catalyst, comprising a noble metal from 0.1 to 1.0 wt-%, is from 270 to 310° C.

In one embodiment, the isomerization temperature for the catalyst comprising Ni from 1.0 to 5.0 wt-%., is from 300° C. to 340° C.

Pressure is typically from 1 bar to 100 bar, preferably from 30 bar to 80 bar, such as from 35 bar to 45 bar. An exemplary pressure is 40 bar. The WHSV is preferably from 0.5 h$^{-1}$ to 3 h$^{-1}$, more preferably from 0.5 h$^{-1}$ to 2 h$^{-1}$, most preferably from 0.5 h$^{-1}$ to 1 h$^{-1}$. And the H$_2$ flow is typically from 100 to 800 N-L H$_2$/L feed, preferably from 200 to 650 N-L H$_2$/L feed, most preferably from 350 to 500 N-L H$_2$/L feed.

During isomerization n-paraffins are converted to i-paraffins. Preferably, the conditions are chosen such that the branches are located at or near the terminal ends of the molecules, and thereby the cold flow properties of renewable jet fuel and renewable naphtha may be improved.

It was found particularly advantageous to use separate steps or reactors for the hydrodeoxygenation and for the isomerization to be able to freely select the most optimal reaction conditions, such as temperatures and pressures, independently for both steps. Moreover, any interference due to catalysts or reaction phase products could be eliminated, thus ensuring optimal infeed onto the catalysts. For example, removal of possibly formed hydrogen sulfide from the intermediate processing stream from hydrodeoxygenation before contacting it with the isomerization catalyst, when e.g., Pt, is preferred.

Use of the low temperature isomerization catalyst of the present disclosure further enables performing the whole processing at a lower temperature than typically used.

Stabilization

There may be further steps included either combined with the hydroisomerization step, or thereafter, as separate process steps. These may comprise further purification, fractionation, or stabilization. Typically, such additional process steps allow better control of desired properties of the effluent.

The isomerization step may comprise optional stabilization e.g. by stripping before the effluent is exiting the reactor or there may be a separate optional stripping step after the isomerization step, such as an additional stripping column.

Separation of the Obtained Products

The hydroisomerized stream, or optionally stabilized hydroisomerized stream, is subjected to a separation step to give rise to
  (i) a fraction rich in C1-C4 hydrocarbons, thereby recovering the renewable gas,
  (ii) a fraction rich in C5-C9 hydrocarbons, thereby recovering the renewable naphtha range components suitable for use as aviation gasoline i.e. avgas or naphtha, and
  (iii) a fraction rich in C10-C16 hydrocarbons, thereby recovering the renewable jet fuel range components.

As defined herein, a fraction rich in C1-C4 hydrocarbons, means in the context of the present disclosure that the wt-% amount of the C1-C4 hydrocarbons in the fraction, based on the total weight of the fraction, is higher than the wt-% (weight percent) amount of the C1-C4 hydrocarbons in the hydroisomerized stream, or optionally the stabilized hydroisomerized stream, based on the total weight of the hydroisomerized stream, or optionally the stabilized hydroisomerized stream.

As defined herein, a fraction rich in C5-C9 hydrocarbons, means in the context of the present disclosure that the wt-% amount of the C5-C9 hydrocarbons in the fraction, based on the total weight of the fraction, is higher than the wt-% amount of the C5-C9 hydrocarbons in the hydroisomerized stream, or optionally the stabilized hydroisomerized stream, based on the total weight of the hydroisomerized stream, or optionally the stabilized hydroisomerized stream.

As defined herein, a fraction rich in C10-C16 hydrocarbons, means in the context of the present disclosure that the wt-% amount of the C10-C16 hydrocarbons in the fraction, based on the total weight of the fraction, is higher than the wt-% amount of the C10-C16 hydrocarbons in the hydroisomerized stream, or optionally the stabilized hydroisomerized stream, based on the total weight of the hydroisomerized stream, or optionally the stabilized hydroisomerized stream.

The separating may comprise one or more of distilling, fractionating, evaporating, flash-separating, membrane separating, extracting, using extractive-distillation, using chromatography, using molecular sieve adsorbents, using thermal diffusion, complex forming, preferably at least fractionating, distilling, extracting, using extractive-distillation.

Separation may be conducted in several steps. For example, a first separating step of the hydroisomerized stream may produce a first C1-C4 hydrocarbon fraction. Thereafter, a second separating step from the first C1-C4 hydrocarbon composition may produce a second, a further enriched C1-C2 hydrocarbon composition, as well as, a fraction enriched in C4 hydrocarbons, and a fraction enriched in C3 hydrocarbons.

Similarly, a further separating step may produce a fraction rich in C5-C9 hydrocarbons.

Similarly, a further separating step of the hydroisomerized stream may produce a fraction rich in C10-C16 hydrocarbons, which may be enriched by further separation.

This kind of staged separation of some of the desired fractions may be beneficial, e.g., when also other, to some extent overlapping fractions are to be recovered in concentrated forms.

Any of the separated fractions may be subjected to one or more further purification and/or fractionation steps. The optional purification and/or fractionation steps or treatments may be selected depending on the intended end use and/or desired degree of purity of the renewable gas fraction, the renewal naphtha fraction and the renewal aviation fuel.

In certain embodiments the process further comprises purifying the fraction rich in C3-C4 hydrocarbons, the fraction rich in C5-C9 hydrocarbons, and/or the fraction rich in C10-C16 hydrocarbons until the total content of the C3-C4 hydrocarbons, C5-C9 hydrocarbons and/or the C10-C16 hydrocarbons reaches at least 85 wt-%, preferably at least 90 wt-%, more preferably at least 95 wt-%, even more preferably at least 99 wt-% or at least 99.5 wt-%, based on the total weight of the fractions.

The possible remainder of hydrocarbons produced higher than C16 may be recovered and used for e.g., diesel fuel production.

Typically, the C10-C16 hydrocarbons obtained are suitable for use as renewable jet fuel components. Similarly, the C5-C9 hydrocarbons obtained are suitable for use as renewable naphtha components or suitable for use as aviation gasoline i.e., avgas, fulfilling the requirements for naphtha and/or avgas.

According to one embodiment the method further comprises separating C3 hydrocarbons and C4 hydrocarbons from the fraction rich in C3-C4 hydrocarbons thereby producing renewable propane and renewable butane suitable for use in further refining.

According to one aspect the present invention concerns use of a catalyst comprising metal impregnated ZSM-23 zeolite on a support, wherein
  a) the metal is selected from noble metals and Ni and any combinations thereof, and metal content of the catalyst is from 0.1 wt-% to 5.0 wt-%,
  b) the ZSM-23 zeolite comprises one or more of the following features
    $SiO_2/Al_2O_3$ molar ratio from 10 to 85, preferably from 15 to 85 such as from 40 to 80,
    crystallinity from 40% to 95%, measured by X-ray diffraction (XRD) according to ASTM D5758-01 (2021), BET surface area from 180 m²/g to 350 m²/g, such as from 200 m²/g to 300 m²/g, determined by nitrogen physisorption,
acidity is from 250 μmol/g to 500 μmol/g, measured with NH₃-TPD method, wherein acidity is calculated from the amount of NH₃ adsorbed at 200° C. and desorbed between 100° C. and 500° C.,
ratio of Brønsted acid sites to Lewis acid sites is from 10 to 20, measured by the pyridine FTIR, and
crystalline zeolite particles are needle-like particles of a size below 2 μm along the needle, and
c) the support comprises alumina, silica, or alumina-silica
for producing renewable gas, renewable naphtha, or components thereto and renewable jet fuel or components thereto from a renewable paraffinic feed by hydroisomerization reaction in presence of hydrogen flow wherein the hydroisomerization reaction comprises one or more of:
a temperature in the range from 270° C. to 340° C.,
a pressure in the range from 10 bar to 100 bar,
a WHSV in the range from 0.5 h⁻¹ to 3 h⁻¹, and
a H₂ flow of 100-800 N-L H₂/L feed.

EXPERIMENTAL

Example 1

Fresh Pt impregnated ZSM-23 (Pt/ZSM-23) catalysts according to the most preferred embodiment of this disclosure, and fresh Pt impregnated SAPO-11 (Pt/SAPO-11) comparative catalysts were tested in a test reactor system comprising 16 individual stainless steel fixed-bed reactors, which could be run in parallel. The Pt loading of both catalysts was comparable, 0.5 wt-% of platinum and the catalysts were used without passivation. Passivation is anticipated to enhance the performance of both catalysts, e.g., in terms of selectivity and reaction activity, but it was not considered to essentially affect the comparative results.

The first tested reaction temperature was 280° C., after which the temperature was increased to 310° C. in all the reactors. Subsequently, the temperature was decreased to 295° C. for the Pt/ZSM-23 catalysts but increased to 340° C. for the Pt/SAPO-11 catalysts. N-hexadecane was used to mimic the HDO effluent. The used process parameters are summarized below:
Drying: 125° C., 8 h, N₂ flow
Reduction: 350° C., 2 h, 40 bar, H₂ flow
Wetting: 200° C., 2 h, 40 bar, H₂ flow
Stabilization: 200° C., 2 h, 40 bar, H₂ flow.
Reaction: 280-340° C., 40 bar, WHSV 1.3 h⁻¹, H₂/oil ratio 300 N-L/L feed, 40 mg catalyst (50-100 μm).

The analysis of the gaseous products was made with an online GC (Agilent 7890) and the analysis of the liquid products was made with an offline GC (QP2010 Ultra EI, Shimadzu) having an FID detector and a mass spectrometer.

Feed conversions using Pt/ZSM-23 (A and B) and Pt/SAPO-11 (A and B) catalysts at different temperatures are presented in Table 1. Two batches of platinum impregnated ZSM-23 and SAPO-11 were prepared to estimate the repeatability of the platinum impregnation and the 16-fold reactor test equipment including online and offline GC analysis (samples Pt/ZSM-23-A and Pt/ZSM-23-B wherein the platinum content of Pt/ZSM-23 A and Pt/ZSM-23 B were 0.48 wt-% and 0.52 wt-%, respectively; and reference samples Pt/SAPO-11-A and Pt/SAPO-11-B). Based on the results obtained, the Pt/ZSM-23 catalysts were very active already at 280° C. with C16 conversions close to 100 wt %. The Pt/SAPO comparative catalysts showed lower activity at 280° C. and reached about full conversion only at 340° C. This indicates that with Pt/ZSM-23 lower reaction temperature may be used for obtaining aviation fuel range, and especially, naphtha range hydrocarbons.

TABLE 1

| Conversion | t = 280° C. | t = 295° C. | t = 310° C. | t = 340° C. |
|---|---|---|---|---|
| Pt/ZSM-23-A | 97.5 | 99.9 | 100.0 | NA |
| Pt/ZSM-23-B | 97.0 | 99.8 | 100.0 | NA |
| Pt/SAPO-11-A | 31.0 | NA | 93.1 | 99.2 |
| Pt/SAPO-11-B | 23.5 | NA | 92.7 | 99.1 |

The formed products were grouped into three hydrocarbon ranges: C1-C4 (gas), C5-C9 (naphtha) and C10-C16 (jet fuel). The product yields (wt-%) for the tested catalysts at different temperatures are presented in table 2 and table 3 at 280° C. and at 310° C., respectively. The naphtha and jet fuel fractions included products from both gaseous and liquid phases.

TABLE 2

| Catalyst T = 280° C. | C1-C4 | C5-C9 | C10-C16 |
|---|---|---|---|
| Pt/ZSM-23-A | 6.2 | 20.8 | 66.9 |
| Pt/ZSM-23-B | 4.6 | 16.0 | 70.4 |
| Pt/SAPO-11-A | 0.2 | 1.2 | 23.4 |

TABLE 3

| Catalyst T = 310° C. | C1-C4 | C5-C9 | C10-C16 |
|---|---|---|---|
| Pt/ZSM-23-A | 24.2 | 60.3 | 13.9 |
| Pt/ZSM-23-B | 20.3 | 55.5 | 20.6 |
| Pt/SAPO-11-A | 1.3 | 5.2 | 73.9 |

At 280° C., the jet fuel range yield of about 68.5 wt % was obtained using the Pt/ZSM-23 catalysts when considering the average yield for both Pt/ZSM-23 experiments. For the Pt/SAPO-11 catalyst, the activity and yield was low at 280° C. Compared to SAPO-11 (jet fuel yield 73.9 wt % at 310° C.), almost as high yield was obtained with the Pt/ZSM-23 (68.5 wt %) already at 280° C. Moreover, the cumulative amount of naphtha and jet fuel was 86.9 wt % (average at 280° C.) with Pt/ZSM-23 compared to 79.1 wt % (at 310° C.) with Pt/SAPO-11. Thus, the combined production of naphtha and aviation fuel range hydrocarbons is even slightly higher at lower temperature compared to Pt/SAPO-11 result at a higher temperature.

Figure 2:
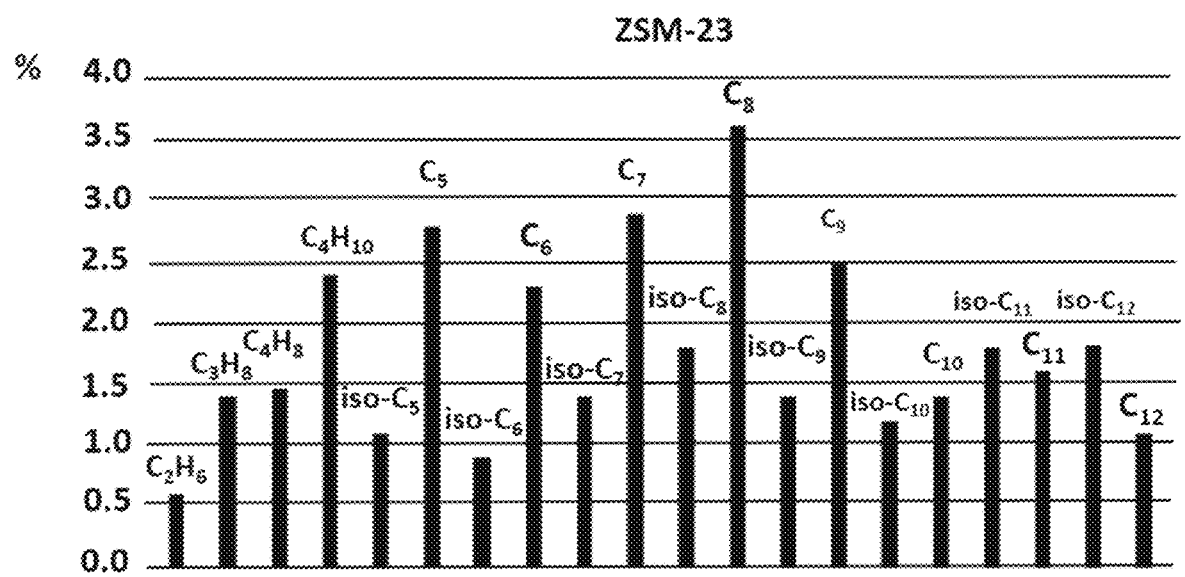
FIG. 2 shows yields of C2-C12 hydrocarbons (wt-%) when the feed was hydroisomerized at 280° C. with platinum impregnated ZSM-23.
Figure 3:
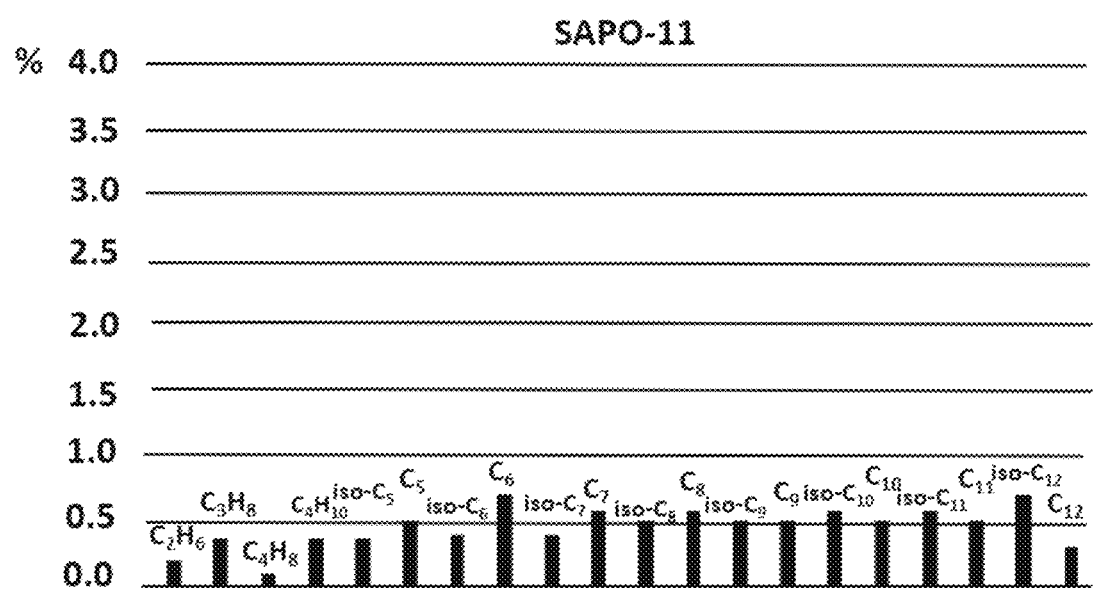
FIG. 3 shows yields of C2-C12 hydrocarbons (wt-%) when the feed was hydroisomerized at 280° C. with platinum impregnated SAPO-11.

Yields of lighter hydrocarbons (from GC analysis of liquid and gas phases) are presented in FIGS. 2 and 3. Pt/ZSM-23 gave the highest yield of light hydrocarbons, and the naphtha was more n-paraffinic although it contained some isomers, as well. With the Pt/SAPO-11, the yields of light products were low in general. Methane was not detected in any of the gaseous products.

Example 2

A further study was conducted in a pilot scale reactor. Fresh 0.5 wt-% Pt catalysts on alumina supports were tested. Hydroisomerization experiments were run in continuous-flow reactors using 4 g of catalyst, 40 bar of pressure. The catalyst was Pt impregnated ZSM-23 supported on commercial alumina-based material, boehmite. The Pt impregnated SAPO-11 catalyst on the same support was used as a comparative catalyst. At the beginning of each run, the catalyst was passivated for a week, subsequently the catalyst was exposed to the feed, and the system was allowed to stabilize for several days at the set temperature. Feedstock used in these experiments was hydrodeoxygenated palm oil according to the most preferred embodiment of this disclosure. The feed contained mainly C10-C26 paraffins, 99.5 wt-%, with minor amounts of stearines and higher carbon number hydrocarbons, less than 0.5 wt-%.

Compared to Pt/SAPO-11, the Pt/ZSM-23 catalyst provided a 120%-160% greater naphtha range hydrocarbon selectivity and a 460%-667% greater gas yield. Furthermore, it was observed that the naphtha and gas fractions increased proportionally to temperature and decreased with higher WHSV. Although the ratio of i-paraffins to n-paraffins obtained by Pt/SAPO-11 was 45%-60% greater than what was obtained by Pt/ZSM-23, the selectivity to i-paraffins in the naphtha range (C5-C9) was 63%-110% greater with Pt/ZSM-23 than with Pt/SAPO-11. The high content of naphtha-range paraffins in the Pt/ZSM-23 products compared to the SAPO-11 product is also clear from the carbon-number distributions. Aside from the high production of naphtha, the Pt/ZSM-23 catalyst provided a selectivity to jet fuel range paraffins (C10-C16) that was only 5%-10% less than with Pt/SAPO-11.

Example 3

The results obtained for 0.48 wt-% Pt/ZSM-23 (A) and 0.52 wt-% Pt/ZSM-23 (B) were further compared to those of 0.48 wt-% Pt/ZSM-12. As a further reference, 0.5 wt-% Pt/SAPO-11 was tested, as well. Experiments were performed in a fixed-bed reactor using n-hexadecane as the HDO effluent feed. It was found that the two zeolites had very similar activity levels at 280° C. under 40 bar $H_2$, which were three times higher than with the Pt/SAPO-11 based catalyst (Table 4). Furthermore, it was shown that the combined selectivity to gases and naphtha at 280° C. is slightly higher with the Pt/ZSM-23 catalyst than with the Pt/ZSM-12 catalyst (Table 5). Finally, at a higher temperature of 310° C., the combined selectivity of naphtha and gases is 78%-86% with Pt/ZSM-23 based catalyst and >90% with Pt/ZSM-12 based catalyst (Table 6). Still, at 310° C., the Pt/ZSM-23 catalyst provides 14%-22% selectivity to jet fuel range hydrocarbons, whereas the selectivity is <2% for Pt/ZSM-12 based catalyst. Selectivity to C3-C4 hydrocarbons was higher in using Pt/ZSM-23 based catalyst than with Pt/ZSM-12 based catalyst at 280° C. i.e. 4.0-5.4% compared to 3.5%, respectively. Therefore, based on these experiments, Pt/ZSM-23 based catalyst appears more advantageous than Pt/ZSM-12 based catalyst for the combined production of jet fuel range hydrocarbons, naphtha range hydrocarbons and gases, because with Pt/ZMS-23 slightly more gases were obtained at 280° C. and aviation fuel range hydrocarbons were maintained better when raising the temperature.

TABLE 4

| Catalyst t = 280° C. | Conversion, wt % |
|---|---|
| Pt/ZSM-23-A | 97.5 |
| Pt/ZSM-23-B | 97.0 |
| Pt/SAPO-11 | 31.0 |
| Pt/ZMS-12 | 98.2 |

TABLE 5

| Catalyst t = 280° C. | C1-C4 | C5-C9 | C10-C16 |
|---|---|---|---|
| Pt/ZSM-23-A | 6.0 | 22.3 | 71.7 |
| Pt/ZSM-23-B | 4.6 | 17.7 | 77.8 |
| Pt/SAPO-11 | 0.4 | 4.7 | 94.8 |
| Pt/ZSM-12 | 3.6 | 19.2 | 77.2 |

TABLE 6

Selectivity of catalysts in hexadecane hydroisomerization at 310° C. and 40 bar $H_2$.

| Catalyst T = 310° C. | C1-C4 | C5-C9 | C10-C16 |
|---|---|---|---|
| Pt/ZSM-23-A | 23.1 | 62.5 | 14.4 |
| Pt/ZSM-23-B | 19.7 | 58.6 | 21.7 |
| Pt/ZSM-12 | 24.5 | 73.9 | 1.6 |

Accordingly, the use of Pt/ZSM-23 as hydroisomerization catalysts is preferred when it is desired to simultaneously increase the yield of renewable naphtha and renewable gas when producing still renewable jet fuel. The production of naphtha and gas do not detract from renewable aviation fuel production.

The naphtha fraction and the gas fractions can be used in the production of C3 and C4 chemicals. The C3 and C4 hydrocarbons can be obtained also through steam cracking of the renewal naphtha produced. Furthermore, the gas fraction contains at least 50 wt-% C3 and C4 hydrocarbons.

The specific examples provided in the description given above should not be construed as limiting the scope and/or the applicability of the appended claims. Lists and groups of examples provided in the description given above are not exhaustive unless otherwise explicitly stated.

The invention claimed is:

1. A method for producing renewable gas, renewable naphtha, and renewable jet fuel or components thereof from a renewable feedstock, the method comprising the following steps:
   a) providing the renewable feedstock,
   b) pre-treating the renewable feedstock by reducing an amount of impurities therein not to include: more than 10 w-ppm alkali metal and alkaline earth metal impurities, calculated as elemental alkali metals and alkaline earth metals; more than 10 w-ppm other metals, calculated as elemental metals; more than 1000 w-ppm nitrogen containing impurities, calculated as elemental nitrogen; more than 30 w-ppm phosphorus containing impurities, calculated as elemental phosphorus; more than 5 w-ppm silicon containing impurities, calculated as elemental silicon; to produce a pre-treated feedstock,
   c) subjecting the pre-treated feedstock to hydrodeoxygenation reaction to produce a hydrodeoxygenated stream, wherein the hydrodeoxygenation reaction comprises one or more of:
      a. a temperature in a range from 250° C. to 400° C.,
      b. a pressure in a range from 10 bar to 200 bar,
      c. a weight hourly space velocity (WHSV) in a range from 0.25 $h^{-1}$ to 3 $h^{-1}$,
      d. a $H_2$ flow from 350 to 1500 N-L $H_2$/L feed, and
      e. a hydrodeoxygenation catalyst selected from Pd, Pt, Ni, Co, Mo, Ru, Rh, and W or any combination thereof, on a support, to produce hydrodeoxygenated stream, d) subjecting the hydrodeoxygenated stream to a gas-liquid separation thereby producing a gaseous stream and a hydrodeoxygenated liquid stream,
e) subjecting the hydrodeoxygenated liquid stream to hydroisomerization reaction comprising
  i. a temperature in a range from 270° C. to 340° C.,
  ii. a pressure in a range from 10 bar to 100 bar,
  iii. a hydroisomerization catalyst comprising a metal impregnated ZSM-23 zeolite on a support, wherein
    a. the metal is selected from noble metals and Ni and any combinations thereof, and metal content of the hydroisomerization catalyst is from 0.1 wt-% to 5.0 wt-%,
    b. the ZSM-23 zeolite comprising the following features:
      $SiO_2/Al_2O_3$ molar ratio is from 10 to 85,
      crystallinity is from 40% to 95%, measured by X-ray diffraction (XRD) according to American Society for Testing and Materials (ASTM) D5758-1 (2021),
      BET surface area is from 180 m$^2$/g to 350 m$^2$/g, determined by nitrogen physisorption,
      acidity is from 250 μmol/g to 500 μmol/g, measured with Ammonia Temperature Programmed Desorption (NH$_3$-TPD) method, wherein acidity is calculated from the amount of NH$_3$ adsorbed at 200° C. and desorbed between 100° C. and 500° C.,
      ratio of Brønsted acid sites to Lewis acid sites is from 10 to 20, measured by the pyridine Fourier Transform Infrared Spectroscopy (FTIR), and
      crystalline zeolite particles are needle-shaped particles of a size below 2 μm along the needle, and
    c. the support comprising alumina, silica, or alumina-silica,
  in the presence of hydrogen flow to produce a hydroisomerized stream,
f) optionally subjecting the hydroisomerized stream to stabilization, to obtain a stabilized hydroisomerized stream, and
g) separating the hydroisomerized stream, or optionally the stabilized hydroisomerized stream at least to
  i) a fraction rich in C1-C4 hydrocarbons thereby producing the renewable gas,
  ii) a fraction rich in C5-C9 hydrocarbons thereby producing the renewable naphtha or components thereto, and
  iii) a fraction rich in C10-C16 hydrocarbons thereby producing the renewable jet fuel or components thereto.

2. The method according to claim 1, wherein in step c), the temperature is in the range from 260° C. to 380° C., the pressure is in the range from 20 bar to 100 bar, the weight hourly space velocity (WHSV) is in the range from 0.5 h$^{-1}$ to 3.0 h$^{-1}$, and the H$_2$ flow is in the range from 350 to 1100 N-L H$_2$/L feed.

3. The method according to claim 1, wherein in step e), a WHSV is in a range from 0.5 h$^{-1}$ to 3 h$^{-1}$.

4. The method according to claim 1, wherein in step e), a hydrogen flow is in a range of 100-800 N-L H$_2$/L feed.

5. The method according to claim 1, wherein the hydroisomerization catalyst is platinum impregnated ZSM-23, and wherein Pt content of the hydroisomerization catalyst is from 0.4 wt-% to 0.6 wt-% of the hydroisomerization catalyst.

6. The method according to claim 1, wherein the hydrodeoxygenation catalyst is selected from a group consisting of CoMo, NiMo, NiW, and CoNiMo on a support.

7. The method according to claim 1, wherein the hydrodeoxygenation reaction comprise the temperature in the range from 250° C. to 400° C., the pressure in the range from 20 bar to 80 bar, the WHSV in the range from 0.5 h$^{-1}$ to 3 h$^{-1}$, and the H$_2$ flow in the range of 350-1500 N-L H$_2$/L feed, and a hydrodeoxygenation catalyst.

8. The method according to claim 1, wherein the hydrodeoxygenated stream comprises at least 92 wt-%, paraffins based on total weight of hydrocarbon products.

9. The method according to claim 1, comprising purifying the fraction rich in C10-C16 hydrocarbons until the total content of the C10-C16 hydrocarbons reaches at least 85 wt-% based on the total weight of the fraction rich in C10-C16 hydrocarbons.

10. The method according to claim 1, comprising purifying the fraction rich in C5-C9 hydrocarbons until the total content of the C5-C9 hydrocarbons reaches at least 85 wt-% based on the total weight of the fraction rich in C5-C9 hydrocarbons.

11. The method according to claim 1, comprising separating C3 hydrocarbons and C4 hydrocarbons from the fraction rich in C1-C4 hydrocarbons.

12. The method according to claim 1, wherein the renewable feedstock is selected from waste and residues of animal fat or oil, plant fat or oil, and fish fat or oil, and mixtures thereof, palm effluent sludge, palm oil mill effluent, sludge palm oil, palm oil fatty acid, tall oil material, used cooking oil, acid oils, animal fats, brown grease, spent bleaching earth oil, technical corn oil.

13. The method according to claim 1, wherein the renewable feedstock comprises triglycerides and/or fatty acids.

14. The method according to claim 1, wherein in step c), the temperature is in the range from 280° C. to 330° C., the pressure is in the range from 20 bar to 80 bar, the WHSV is in the range from 0.7 h$^{-1}$ to 2.5 h$^{-1}$, and the H$_2$ flow is in the range from 350 to 1000 N-L H$_2$/L feed.

15. The method according to claim 6, wherein the support is alumina and/or silica.

16. The method according to claim 1, wherein the hydrodeoxygenated stream comprises at least 95 wt-% paraffins based on total weight of hydrocarbon products.

17. The method according to claim 1, comprising purifying the fraction rich in C10-C16 hydrocarbons until the total content of the C10-C16 hydrocarbons reaches at least 99 wt-% based on the total weight of the fraction rich in C10-C16 hydrocarbons.

18. The method according to claim 1, comprising purifying the fracture rich in C5-C9 hydrocarbons until the total content of the C5-C9 hydrocarbons reaches at least 85 wt-% based on the total weight of the fraction rich in C5-C9 hydrocarbons.

19. The method according to claim 1, wherein the renewable feedstock is selected from palm oil residues and wastes, used cooking oil, acid oils, animal fats, spent bleaching earth oil, technical corn oil.

* * * * *